April 16, 1963 E. V. STATIA, SR 3,085,497
GRATE-ROTATING DEVICE FOR PORTABLE BRAZIER
Filed April 10, 1959 2 Sheets-Sheet 1

INVENTOR.
EDWIN V. STATIA SR.
BY
Barthel & Bugbee
ATTY'S.

April 16, 1963　　　E. V. STATIA, SR　　　3,085,497
GRATE-ROTATING DEVICE FOR PORTABLE BRAZIER
Filed April 10, 1959　　　　　　　　　　　2 Sheets-Sheet 2

INVENTOR.
EDWIN V. STATIA SR.
BY
Barthel & Bugbee
ATTY'S.

United States Patent Office 3,085,497
Patented Apr. 16, 1963

3,085,497
GRATE-ROTATING DEVICE FOR PORTABLE BRAZIER
Edwin V. Statia, Sr., 2244 E. Montecita Ave., Phoenix, Ariz.
Filed Apr. 10, 1959, Ser. No. 805,546
3 Claims. (Cl. 99—340)

This invention relates to cooking devices and, in particular, to portable braziers or grills.

The ordinary backyard portable grill or brazier has a fire pot or bowl in which charcoal is ignited and burned, and over which a circular wire grate is mounted. Means is provided for raising and lowering the grate so as to increase or decrease the distance between it and the meat or other food being grilled or barbecued so as to adjust the food to the condition of the fire and prevent burning of the food by too intense a fire on the one hand and overly slow cooking by too slow a fire. Furthermore, the fire not only varies in overall intensity but also varies locally in intensity in different portions of the firepot. Pivoting the circular grate to enable manual rotation has been unsuccessful in solving the problem of uneven heat distribution not only on account of the inconvenience of manually rotating the grate and of forgetting to do so but also because of the necessity of protecting the fingers or using special insulated implements for rotating the grate in order to avoid burning the fingers.

The present invention provides a motor-driven device applicable to conventional portable braziers for continuously rotating the grate so as to average the heat exposure to the meat or other food being cooked, over the entire revolution of the grate, thereby preventing the food from being overdone at an excessively hot portion of the fire or underdone at a merely warm portion of the fire. Moreover, the present invention provides a grate-rotating device whereby the grate may be raised or lowered, as before, without interfering with the grate raising the lowering mechanism or without limiting the range within which the grate may be raised or lowered.

Accordingly, one object of this invention is to provide a motor-driven grate-rotating device for a portable grill or brazier which will rotate its circular grate while permitting the grate to be raised and lowered through a wide range of heights above the bed of charcoal in the firepot or bowl without interfering with the drive during such raising or lowering.

Another object is to provide a motor-driven grate-rotating device of the foregoing character wherein the grate-rotating device is quickly and easily detachable from the spit rod upon which it is mounted, in order to enable the use of the spit rod in its ordinary manner for roasting poultry and other meat.

Other objects and advantages of the invention will become apparent during the course of the following description of the accompanying drawings, wherein:

FIGURE 4 is a fragmentary central vertical section, partly in side elevation, of a modification of the grill-rotating device shown in FIGURES 1 to 3 inclusive.

Figure 1:
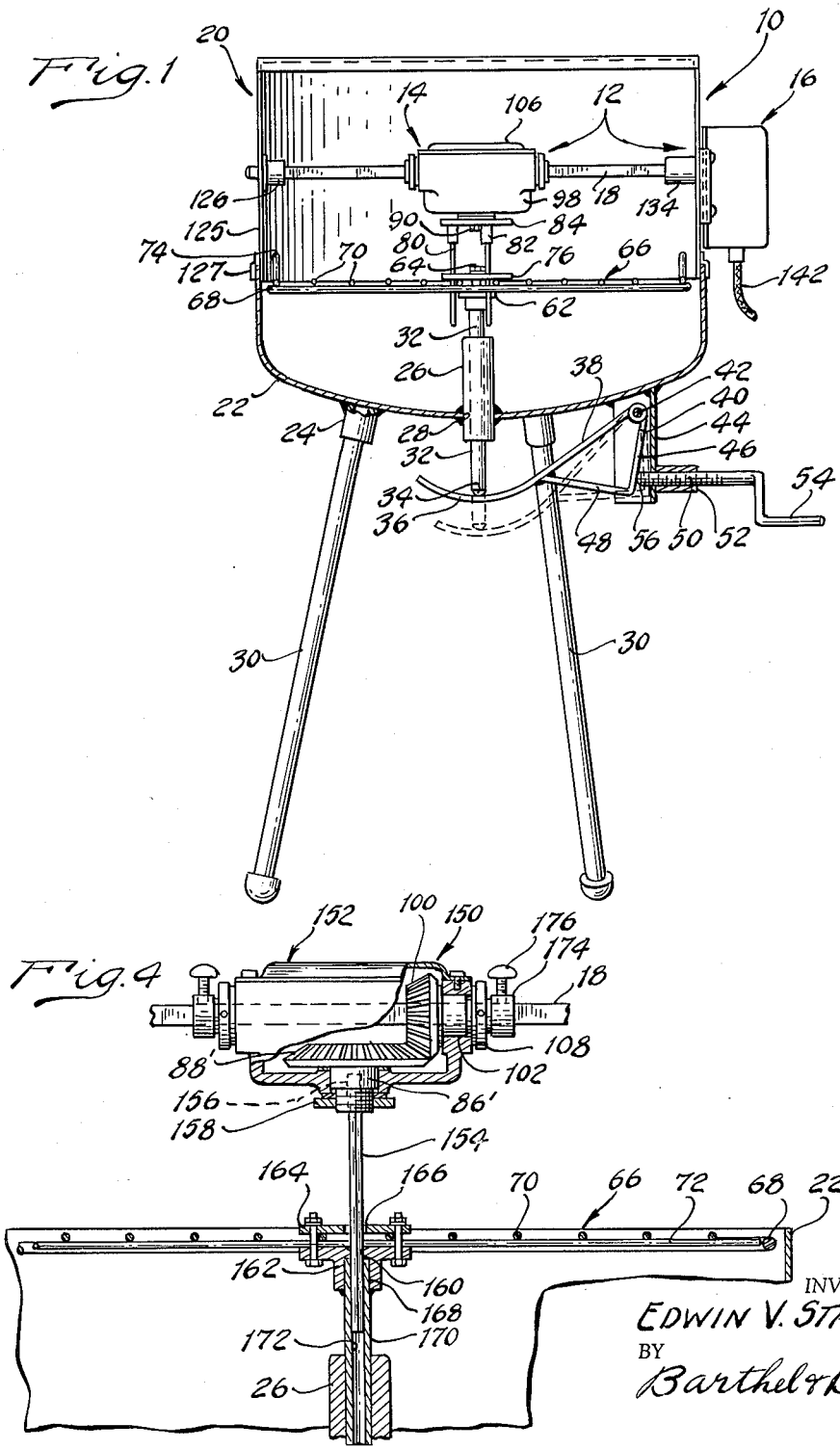
FIGURE 1 is a central vertical section through a portable backyard grill or brazier equipped with an automatic grate-rotating device according to one form of the invention, said device being shown in side elevation.

Referring to the drawings in detail, FIGURE 1 shows a power-rotated portable backyard grill or brazier, generally designated 10, equipped with a power-operated grate-rotating device, generally designated 12, including a grate-rotating unit, generally designated 14, driven by an electric motor reduction drive unit 16 attached to the spit rod 18 of square cross-section. The grate-rotating device 12 is adapted to be applied to a conventional portable grill or brazier, generally designated 20. The grill or brazier 20 consists of a metal bowl or fire pot 22 having tubular sockets 24 welded or otherwise secured thereto at suitable locations, usually three places, spaced at equal circumferential intervals around an elongated central bushing or bearing 26 also welded to the bowl 22 in a central aperture 28 thereof. Secured in the sockets 24 are supporting legs 30 adapted to rest upon the ground or other supporting surface. Reciprocably and rotatably mounted in the bushing 26 is a shaft 32, the lower end 34 of which is engaged by the arcuate end portion 36 of the upper arm 38 of a bellcrank lever 40. The latter is pivotally mounted upon a horizontal pivot pin 42 supported in a vertical bracket 44, the upper end of which is likewise welded to the bottom of the bowl 22 near the periphery thereof. The bellcrank lever 40 also has a vertical arm 46 and an approximately horizontal brace portion 48 substantially at right angles to the arm 46 and forming a bent continuation thereof and of the inclined upper arm 38 so as to form approximately a right triangle. The free end of the brace arm 48 is welded to the inclined upper arm 38.

The bellcrank lever 40 is swung to and fro around the pivot pin 42 as a fulcrum between the solid line and dotted line positions of FIGURE 1, to raise and lower the shaft 32 by means of a screw-shaft 50 threaded through an internally-threaded bushing 52 welded to the bracket 44. The screw shaft 50 has a hand crank 54 on the outer end thereof, whereas its inner end 56 engages the vertical arm 46 of the bellcrank lever 40 near its junction with the brace arm 48.

The upper end 58 of the shaft 32 is bored and threaded as at 60 and externally receives a flanged hub 62 (FIGURE 2) which is held thereon by a cap screw 64 threaded into the bore 60 through the hub 62. Interposed between the hub 62 and the head of the cap screw 64 is a circular grate 66 including an annular rim 68, parallel rods 70 and a pair of parallel reinforcing cross rods 72 at the opposite ends of which handles 74 are mounted, this assembly being held together by welding or other suitable means. Interposed between the grate 66 and the head of the cap screw 64 is a driven coupling disc 76 having a plurality of elongated radial slots 78 therein near the periphery thereof.

Figure 3:
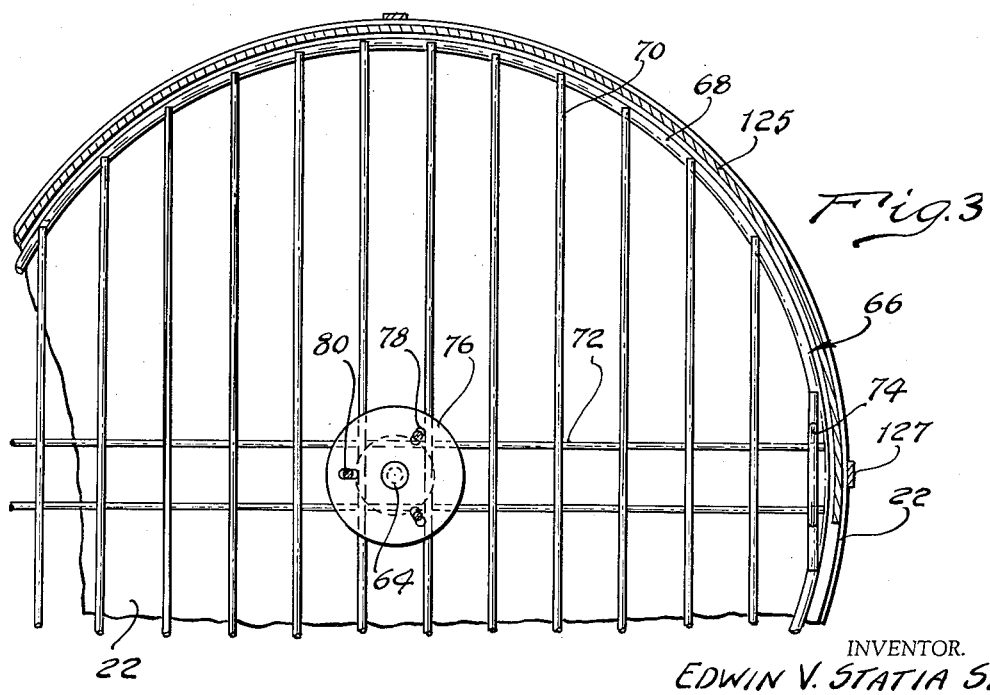
FIGURE 3 is a horizontal section taken along the line 3—3 in FIGURE 2.

Drivingly engaging the radial slots 78 are similarly-located elongated vertical driving rods 80 secured in socket bushings 82 welded or otherwise secured to a driving disc 84. While the driven disc 76 with its radial slots 78 has been provided for an efficient driving connection between the grate-rotating unit 14 and the grate 66, it will be evident from FIGURE 3 that the disc 76 may be omitted and the driving rods 80 so spaced as to drivingly engage the grate rods 70 or the cross rods 72 directly.

The driving disc 84 is secured to the hub 86 of a bevel gear 88 (FIGURE 2) by a cap screw 90 and drivingly connected thereto by a pin 92. The cap screw 90 is threaded into a threaded bore 94 in the hub 86 which itself is rotatably mounted in a vertical bearing bore 96 in a gear housing 98. Meshing with the bevel gear 88 is a bevel pinion 100, the hub 102 of which is rotatably mounted in a bearing bore 104 in the housing 98. The top of the housing 98 is closed by a cover 106 bolted or otherwise secured thereto, and the end of the hub 102 is threaded to receive a retaining nut 108. Diametrically opposite the pinion 100 in the gear housing 98 is a flanged bearing bushing 110 which is rotatably mounted in a bearing bore 112 and threaded to receive a retaining nut 114. The hub 102 of the pinion 100 and the bearing bushing 110 are provided with aligned bores 116 and 118 respectively preferably of square cross-section to slidably receive a rod or spit 120 of the same cross-section as the bores 116 and 118, such as a square cross-section, in order to establish a driving connection therebetween. The rod 102 is provided at its outer end with a reduced diameter portion 122 which rests and rotates in a slot 124 in a semi-cylindrical windshield 125 fitted onto and into the top of the bowl 22 and is held in alignment therewith by a stop collar 126 having a bore 128 of square cross-section and a thumb screw 130 for clamping it in position.

The opposite end of the rod or spit 120 (FIGURE 2) is seated in a bore 132 also of square cross-section in the output shaft 134 of the electric motor reduction drive unit 16. The latter consists of a housing 138 secured as by the fasteners 140 to the windshield 125 on the opposite side thereof from the slot 124. The unit 16 contains an electric motor and speed reduction gearing (not shown), the motor being supplied with electric current through a conductor cable 142 from an ordinary domestic lighting current outlet.

In the operation of the form of the invention shown in FIGURE 1, supplying of electric current to the electric motor reduction drive unit 16 through the conductor cable 142 causes rotation of the output shaft 134 and spit rod 18 at a reduced speed, consequently causing slow rotation of the driving disc 84 and depending drive rods 80. This slow rotation is transmitted through the slots 78 to the driven coupling disc 76 and by the latter to the grate 66, rotating the grate 66 and the meat or other food upon it slowly over the burning charcoal bed in the bowl or fire pot 22. In this manner, the heat from the burning charcoal is averaged over each revolution of the grate by subjecting the food to all parts of the charcoal bed over which it passes in its circular orbital path. Thus, the food is cooked without being burnt on the one hand or being undercooked on the other, as in prior portable grills or braziers where rotation, if at all possible, was only manually obtainable.

While rotating of the grate 66 is taking place, the crank 54 can be rotated in one direction or the other to raise or lower the vertical shaft 32 by means of the bell crank lever 40, as shown by the solid line and dotted line positions of the parts 34 and 36 in the lower central portion of FIGURE 1. As the grate 66 is raised or lowered in order to adjust the food to the intensity of the heat from the charcoal bed, the driving connection between the grate 66 and the driving rods 80 is constantly maintained as the disc 76 slides upward or downward past the rods 80 passing through the driving slots 78.

If the driven disc 76 is omitted, a similar action occurs by the direct driving engagement and sliding contact of the driving rods with the grate rods 70 or cross rods 72. The location of the driving rods 80 in the central portion of the fire pot 22 enables the grate 66 to be raised and lowered through its maximum range without interrupting the driving connection as would be the case by a wheel or gear drive applied to the peripheral ring 68 of the grate 66 in the shallower peripheral portion of the bowl 22. Such a peripheral wheel drive, moreover, would cause the speed of rotation of the grate 66 to vary at its different levels of adjustment by being moved nearer to or farther from the center of the peripheral driving wheel.

The portable grill or brazier 10 may be used for cooking fowl or meat roasts upon the spit rod 18 by removing the grate-rotating device 14 merely by sliding the spit rod 18 through the device 14, removing the latter and then replacing the spit rod 18 with the fowl or meat impaled thereon.

Figure 2:
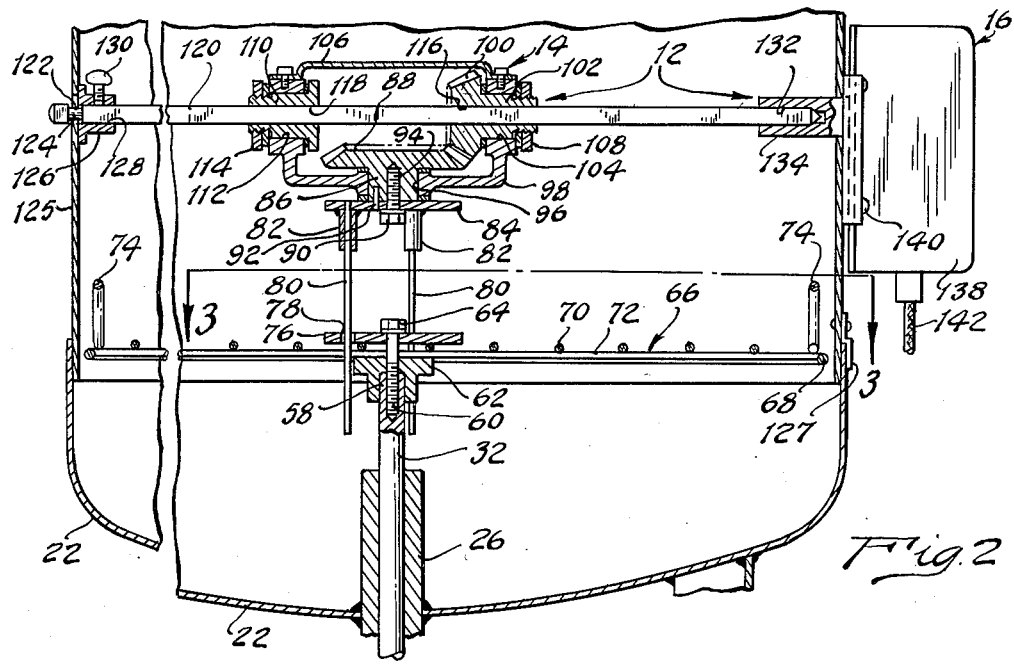
FIGURE 2 is an enlarged fragmentary view similar to the upper portion of FIGURE 1, with the grate-rotating device also in central vertical section.

The modified grate-rotating device, generally designated 150, shown in FIGURE 4 has a grate-rotating unit 152 which is generally similar to the grate-rotating unit 14 and is similarly mounted on the rod 18, hence similar parts are designated with the same reference numerals. The driving connection with the grate 66, however, is made through a central shaft 154 preferably of square cross-section and seated at its upper end in a socket 156 of similar cross-section in the hub 86' of the bevel gear 88. In FIGURE 4, the hub 86' of the bevel gear 88', like the hub 102 of the bevel pinion 100 in FIGURE 2, is threaded to receive a retaining nut 158.

The square shaft 154 passes through and drivingly engages a hole 160 of similar cross-section in a flanged hub 162 below the grate 66 and bolted to a retaining disc 164 on top of the grate 66 and having a circular clearance hole 166 in the center thereof for the square shaft 154. Seated in a socket 168 in the hub 162 and secured thereto by welding or other suitable means is a tubular shaft 170 which replaces the solid shaft 32 of FIGURE 1 and which has a central clearance bore 172 of circular cross-section slidably receiving the square shaft 154. The tubular shaft 170, like the solid shaft 32 of FIGURE 1, is slidably supported in the elongated vertical bushing 26 mounted in the center of the bowl or fire pot 22. Collars 174 with clamping screws 176 are mounted on the spit rod 18 for holding the unit 152 in a central position thereon.

In the operation of the modified grate-rotating device 150, the transmission of power from the electric motor reduction unit 16 through the spit rod 18 and bevel gears 100 and 88' to the hub 86' of the latter is the same as in the form of the invention shown in FIGURE 1, but the transmission of the drive through the vertical square shaft 154 and correspondingly square hole 160 in the hub 162 imparts rotation to the grate 66 coaxial with its tubular supporting shaft 170. At the same time, however, the grate 66 can be raised or lowered by the bellcrank mechanism shown at 40 and 54 in FIGURE 1, as applied to the lower end of the tubular shaft 170 in a manner similar to its application to the solid shaft 32 in FIGURE 1, without interrupting its rotational drive.

What I claim is:
1. A grate-rotating device for attachment to the rotary grate of a rotary brazier, said device comprising a rotary brazier spit rod mounted for rotation about an axis of rotation, a housing having spaced opposite end walls with aligned coaxial openings therein, said spit rod extending through said openings, an elongated substantially vertical driven element having upper and lower components, said upper component including a driven gear rotatably mounted in said housing and said lower component including an elongated rod depending from said upper component, said elongated rod having a coupling-engaging portion near the lower end thereof, said driven element having its axis of rotation disposed substantially perpendicular to the axis of rotation of said spit rod, a rotary driving gear disposed in mesh with said driven gear, said driving gear being rotatably mounted in one of said openings and having a bore therein detachably receiving the spit rod, means drivingly connecting said driving gear to the spit rod, and a relatively-sliding driving coupling member adapted to be secured to the grate and engaging said elongated rod in vertically-slidable driving relationship therewith.

2. A grate-rotating device, according to claim 1, wherein said elongated rod of said driven element is disposed eccentric to the axis of rotation of said driven gear.

3. A grate-rotating device, according to claim 1, wherein said rotary coupling member is drivingly engaged by said elongated rod of said driven element at a location spaced away from the axis of rotation of said rotary coupling member.

References Cited in the file of this patent
UNITED STATES PATENTS

| | | |
|---|---|---|
| 254,206 | Fox | Feb. 28, 1882 |
| 653,619 | Devin | July 10, 1900 |
| 1,200,143 | Schrade | Oct. 3, 1916 |
| 2,057,421 | Dickson | Oct. 13, 1936 |
| 2,250,707 | Gross | July 29, 1941 |
| 2,819,667 | Victor | Jan. 14, 1958 |